Sept. 29, 1959   J. S. WREFORD ET AL   2,906,807
SEALED WELDING CABLE TERMINALS
Filed Nov. 29, 1955
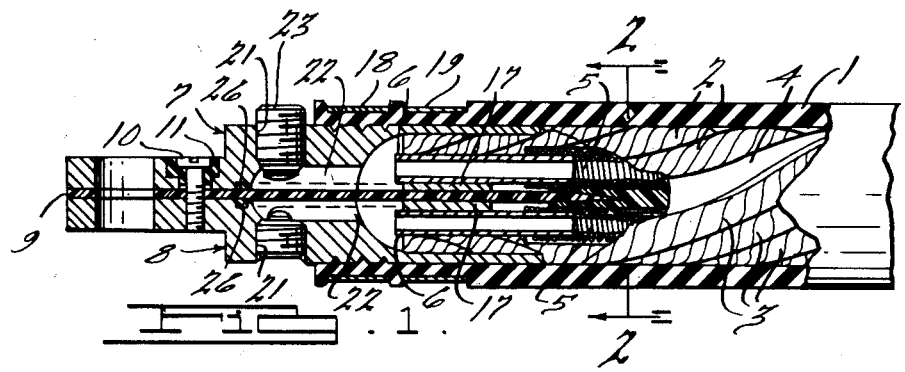
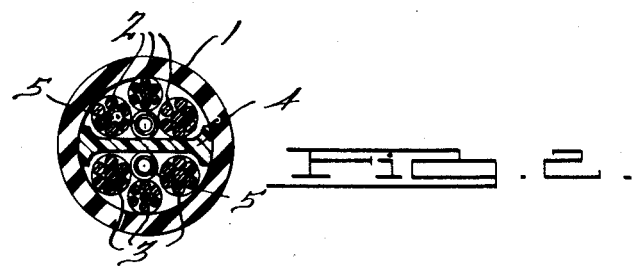
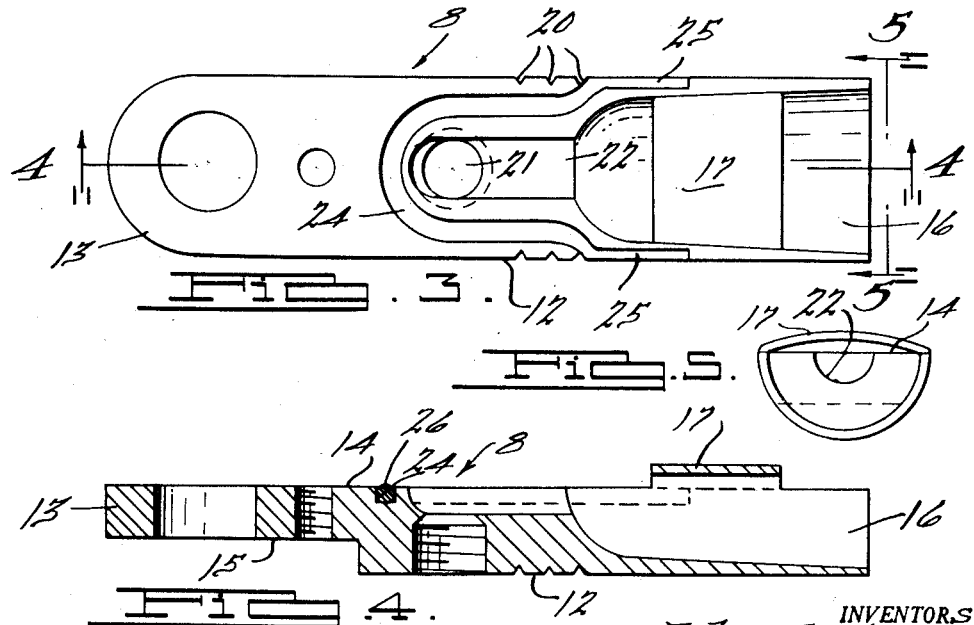
INVENTORS.
John S. Wreford.
Frank L. Harris.
BY
Harness, Dickey & Pierce
ATTORNEYS.

United States Patent Office 2,906,807
Patented Sept. 29, 1959

2,906,807
SEALED WELDING CABLE TERMINALS

John S. Wreford, Franklin, and Frank L. Harris, Ann Arbor, Mich., assignors to Gar Wood Industries, Inc., a corporation of Michigan Application November 29, 1955, Serial No. 549,630

3 Claims. (Cl. 174—15)

The present invention relates to water-cooled electric cables for use on portable welding guns and particularly to the type of cable shown in United States Patents 2,504,777 and 2,691,691.

In cables of the above type two conductors, each comprising a plurality of twisted cables, are enclosed within a water-conducting hose or casing and separated from each other by a diametrically disposed insulating separator. The ends of the conductors are fastened, respectively, to a pair of terminals, each of which is generally semicylindrical in cross section. The flat inner faces of the terminals are separated by a flat separator sheet of insulating material which merges with the insulating separator within the hose or casing. The arrangement and form of the terminals is such that the hose may be withdrawn off the terminals for repair and replacement.

It has been found advantageous in the construction of terminals of the above type to form the insulating sheet between the terminal parts of a relatively hard, heat-resisting material but such insulating materials have been found to provide an inferior seal, with the result that difficulties have been encountered with leakage of the cooling water which is circulated through the cable housing and is usually under water main pressures of 60 to 70 pounds per square inch.

It is an object of the present invention to provide an improved terminal assembly having the advantages of the above described construction and, at the same time, an effective and novel form of seal which will prevent the leakage of water.

Other objects will become apparent from the following specification, the accompanying drawings and the appended claims.

In the drawings:

Figure 1 is a longitudinal section through one end of the cable showing the improved terminal construction;

Fig. 2 is a transverse section taken on the line 2—2 of Fig. 1;

Fig. 3 is an elevational view looking at the flat side of one of the terminal elements;

Fig. 4 is a longitudinal section taken on the line 4—4 of Fig. 3; and

Fig. 5 is an end view of one of the terminal elements, which is illustrated in Figs. 3 and 4 and is taken on the line 5—5 of Fig. 3.

As best shown in Figs. 1 and 2, the cable comprises a hose-like casing 1 containing a pair of conductors 2 and 3, each formed of three braided copper wire cables. The two conductors are separated and insulated from each other by a diametrically positioned sheet of molded rubber or resin 4. In order to provide a clear passage for the flow of cooling water, the assembly also includes a pair of coiled spring elements 5, one positioned on each side of the insulating member 4. The springs 5 terminate short of the ends of the conductors, and short lengths of metal tubing 6 are secured to the ends of the springs by short overlapping coil springs of slightly larger diameter to conduct cooling water to the springs. The complete assembly of the conductors, coiled spring and insulating separator 4 are twisted throughout the length of the cable, as best indicated in the right-hand portion of Fig. 1.

The cable terminal assembly comprises a pair of terminal elements 7 and 8 having generally flat inner surfaces which seat against an intermediate insulating sheet 9 which is of the full width of the terminals and extends into a slot formed in the extremity of the insulating separator 4. The two terminal elements are clamped together and against the insulating sheet 9 in any suitable manner, as by a cap screw 10, which is insulated from the terminal 7 by an insulating bushing 11 and which is threaded into a tapped opening in the terminal element 8 in the manner best shown in Fig. 1.

The terminal elements 7 and 8, which, except for the openings for screw 10, are identical in construction, are each formed of an inner section 12 and an outer section 13 having a common flat surface 14 which seats against the insulating sheet 9. The inner section 12 is generally semicylindrical in cross section, as best shown in Fig. 5, whereas the outer section is provided with a flat outer surface 15 and provides a means for attachment to a welding gun.

The flat interior surface of each terminal element is provided with a recess 16 which receives the end of the conductor 2 or 3. After the conductor is inserted in the recess, a deformable wall portion 17 which bridges the recess 16 is compressed downwardly to clamp the conductor cables together with the ends of the springs 5 and the inner ends of the tubes 6 within the recess and establish a firm electric connection between the conductor and the terminal. This brings the upper surface of the bridging portion 17 to or below the level of the flat surface 14 so that the bridging section will not interfere with the flat separator sheet 9 in the final assembly. The tube sections 6 prevent collapse of the springs 5 due to the clamping force exerted by portion 17.

When the terminal elements are secured to the conductors and are also clamped together against the separator sheet 9, the casing or hose 1 may be pulled over the terminals into its final position illustrated in Fig. 1, and is then securely clamped to the cylindrical outer surface formed by the terminal elements by means of strap clamps 18 and 19. The outer peripheries of the terminal elements may be provided with a plurality of circumferential grooves 20 into which the hose is compressed to assist in preventing leakage between the interior of the hose and the exterior of the terminal elements.

As best shown in Fig. 1, a portion of the semicylindrical section 12 of each terminal projects beyond the end of the hose or casing 1 and is provided with a pair of tapped openings 21 which communicate with the recess 16 through longitudinal recesses 22 formed in the inner faces of the terminal elements. The tapped openings 21 may be used to connect hose fittings for connection to a source of cooling water. Either one or both of the openings may be connected directly to a supply of cooling water, or one of the tapped openings 21 may be plugged, as shown in Fig. 1, by a plug 23, in which event the insulating sheet 9 is provided with a central opening aligned with the tapped openings 21 and through which water may flow.

In the construction above described, leakage of water between the contacting flat surfaces of the terminal elements and the insulating sheet 9 is prevented by means of a pair of sealing strips which are positioned in grooves formed in the flat faces of the terminal elements. As best shown in Figs. 3 and 4, each terminal element is provided with a generally U-shape groove 24 which, at its center portion, extends out and around the recesses 22 and includes end portions 25 which lie at the edges of the flat surface of the terminal element at a region entirely within the hose or casing 1.

Positioned within each groove is a yieldable sealing element 26 of rubber or rubber-like material which is preferably circular in cross section. As best shown in Fig. 4, the groove 24 is generally rectangular, and the sealing element 26 has a diameter slightly in excess of the depth of the groove so that it will be compressed between the terminal element and the insulating sheet 9 upon assembly and perform a sealing function. The strip is the full length of the groove 24 including its end portions 25; and, consequently, the ends of the strip are sealed not only against the terminal and the flat insulating sheet 9 but also against the interior of the hose at a point inwardly disposed with respect to the end portion of the hose, which is clamped and sealed against the cylindrical outer surfaces of the terminal elements.

As a result, the interior of the hose and also the interior portion of the terminal, which will contain cooling water under pressure, are sealed from the exterior by a continuous seal which includes the hose and the two strips of sealing material 26, thus effectively preventing leakage of the cooling water.

What is claimed is:

1. A water-cooled flexible welding cable comprising a pair of flexible conductors, a flexible water-conducting, hose-like casing enclosing said conductors, means within the casing for electrically insulating said conductors from each other, a pair of terminal members having inner surfaces, an insulating member intermediate said terminal members and having surfaces on opposite sides thereof which confront said inner surfaces on said terminal members, respectively, to form two pairs of confronting surfaces, the inner end portions of said terminal members having outer surfaces formed to define with the exposed edges of said insulating member a cylindrical inner section which fits within one end of said casing, said casing having a water-tight fit on said cylindrical section, the confronting surface of at least one of said terminal members being provided with a water-conducting recess which extends from the inner end of the terminal to a point outwardly beyond the water-tight fit of said casing with said cylindrical section, one of the confronting surfaces in the pair which included said one terminal member being provided with an uninterrupted groove which extends from one side edge of said one terminal member at a point within the casing to the opposite side edge of said one terminal member at a point within the casing, the intermediate portion of said groove extending generally longitudinally of said one terminal member and around the outer side of said recess in spaced relationship thereto, and an elongated yieldable sealing element positioned within said groove in sealing engagement with said one terminal member and said insulating member, the end portions of said sealing element being in sealing engagement with the casing and terminating within the casing.

2. A water-cooled flexible welding cable comprising a pair of flexible electrical conductors, a flexible water-conducting, hose-like casing enclosing said conductors, means within the casing for electrically insulating said conductors from each other, a pair of terminal members having inner surfaces, an insulating member intermediate said terminal members and having surfaces on opposite sides thereof which confront said inner surfaces on said terminal members, respectively, to form two pairs of confronting surfaces, the inner ends of said terminal members having outer surfaces formed to define with the exposed edges of said insulating member a cylindrical inner section which fits within one end of said casing, said casing having a water-tight fit on said cylindrical section, the confronting surface of at least one of said terminals being provided with a water-conducting recess which extends from the inner end of the terminal to a point outwardly beyond the end of the casing and is spaced from the side edges of the confronting surface, one of the confronting surfaces in the pair which includes said one terminal having an uninterrupted groove which extends from one side edge of said one terminal at a point within the casing to the opposite side edge of said one terminal at a point within the casing, the intermediate portion of said groove extending generally longitudinally of said one terminal beyond said casing and around the outer side of said recess in spaced relation thereto, and a strip of yielding sealing material compressed within said groove in sealing engagement with said one terminal member and said insulating member, the end portions of said strip being in sealing engagement with the casing and terminating within the casing.

3. A water-cooled flexible welding cable comprising a pair of flexible conductors, a flexible water-conducting, hose-like casing enclosing said conductors, means within the casing for electrically insulating said conductors from each other, a pair of terminal members having inner surfaces, an insulating member intermediate said terminal members and having surfaces on opposite sides thereof which confront said inner surfaces on said terminal members, respectively, to form two pairs of confronting surfaces, the inner end portions of said terminal members having outer surfaces formed to define with the exposed edges of said insulating member a cylindrical inner section which fits within one end of said casing, said casing having a water-tight fit on said cylindrical section, the confronting surface of at least one of said terminals being provided with a water-conducting recess which extends from the inner end of the terminal to a point outwardly beyond the end of the casing and is spaced from the side edges of the confronting surface, a radial water inlet opening in said one terminal communicating with the outer end of said recess, the confronting surface of said one terminal being provided with an uninterrupted groove which extends from one side edge of said one terminal at a point within the casing to the opposite side edge of said one terminal at a point within the casing, the intermediate portion of said groove extending outwardly of the casing and around the outer side of said recess in spaced relation thereto, each end portion of said groove extending longitudinally of the terminal at the edge of the confronting surfaces of said one terminal and the insulating member within the casing, and a strip of yielding sealing material compressed within the groove in sealing engagement with said one terminal and said insulating member, the ends of said sealing strip lying in and extending along said longitudinal portions of the groove in sealing engagement with said casing, said strip of sealing material, in its free state, being circular in cross section and having a diameter which is greater than the depth of the groove.

References Cited in the file of this patent

UNITED STATES PATENTS

| | | |
|---|---|---|
| 2,691,691 | Wreford | Oct. 12, 1954 |
| 2,702,311 | Botterill et al. | Feb. 15, 1955 |
| 2,740,098 | Phillips | Mar. 27, 1956 |
| 2,752,579 | Caldwell et al. | June 26, 1956 |
| 2,788,385 | Doering et al. | Apr. 9, 1957 |